June 24, 1930.  C. P. BROCKWAY  1,767,506
HIGH PRESSURE ENGINE
Original Filed Sept. 13, 1920  2 Sheets-Sheet 1
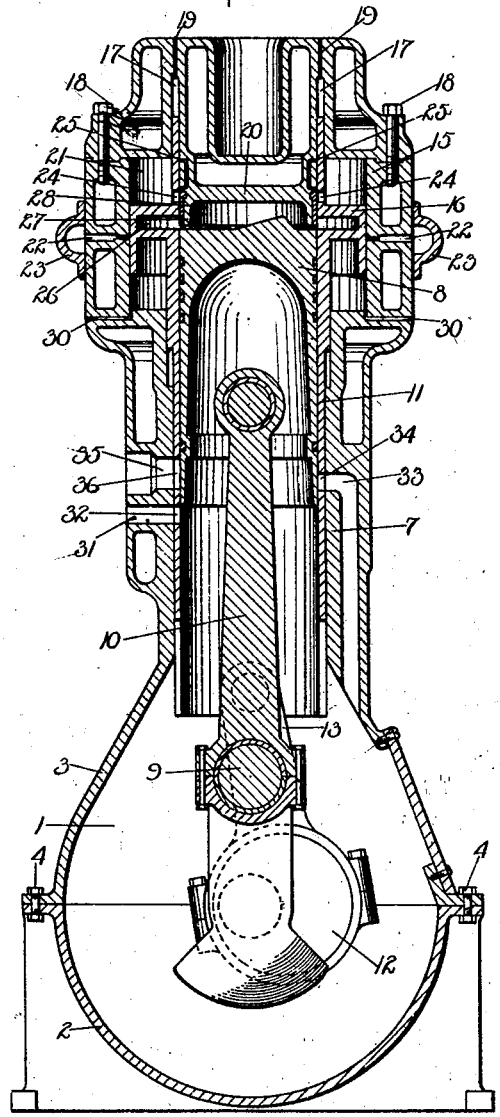
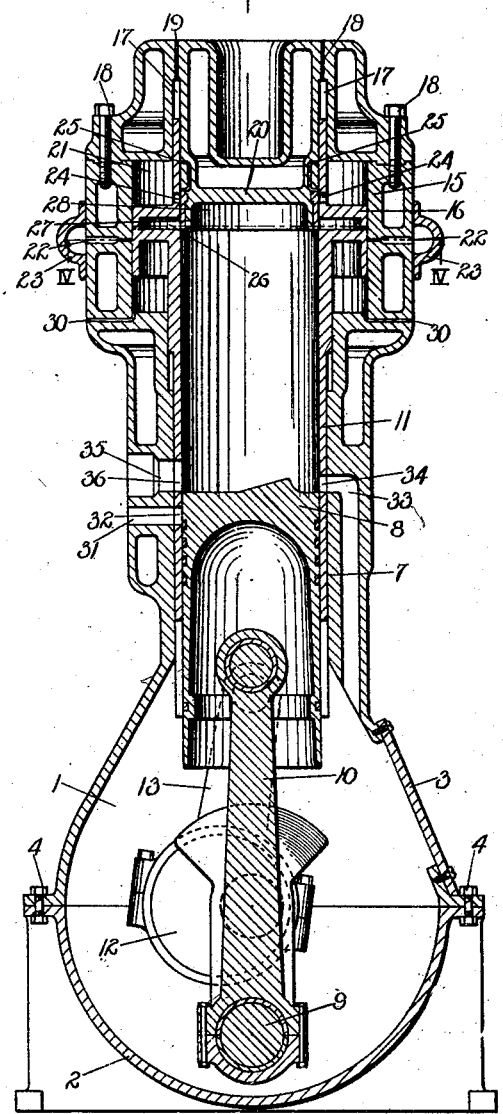
INVENTOR.
Carl P. Brockway
BY Chester W. Gravel
ATTORNEY

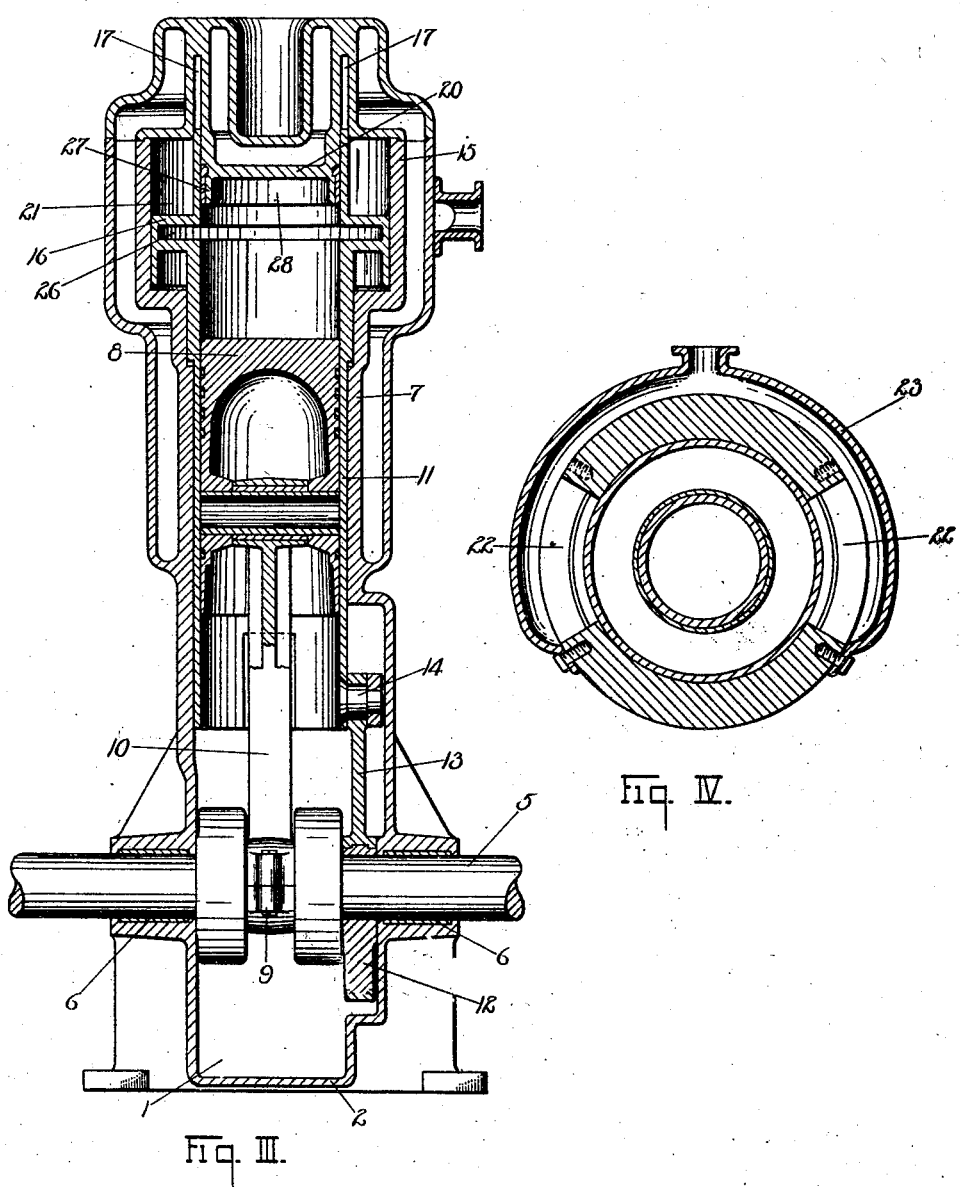

Patented June 24, 1930

1,767,506

UNITED STATES PATENT OFFICE

CARL P. BROCKWAY, OF PATERSON, NEW JERSEY, ASSIGNOR TO INDUSTRIAL RESEARCH CORPORATION, OF TOLEDO, OHIO, A CORPORATION OF DELAWARE

HIGH-PRESSURE ENGINE

Application filed September 13, 1920, Serial No. 410,020. Renewed April 7, 1930.

This invention relates to a two cycle internal combustion engine in which the fuel is compressed in a separate chamber from the air of combustion and therefore permits very high compression of both the fuel and air without causing preignition. The objects of this invention stated more specifically are as follows:

To provide an engine having a fuel gas compressed in a chamber separate from that in which the air is compressed and having the fuel gas and air slowly intermixed at the proper time, whereby a non-explosive combustion is automatically produced.

To compress the air of combustion to a higher pressure than the fuel pressure and to intermix the fuel and air by admitting the compressed air into a chamber containing the compressed fuel.

To compress a fuel gas in an enlarged portion of the engine cylinder by means of a plunger carried by a cylindrical sleeve operable within the engine cylinder.

To bypass the compressed gas to a space within the movable sleeve and to transport the compressed gas therein to a point where connection is made between the said space and the combustion space.

To make this connection between the compressed gas and air by uncovering a port extending entirely around the cylinder so that burning begins at once throughout the periphery of the cylinder.

To compress the air within the clearance space to approximately 500 lbs. per square inch and to compress the gas to approximately 100 lbs. per square inch and to cause a slow intermixture of the gas and air to cause a nonexplosive combustion.

Other objects and those relating to economies of manufacture, simplicity and lightness of construction, etc., will appear as I proceed with a detailed description of that particular embodiment of the invention which for the purposes of illustration I have shown in the appended drawings in which, Figure I is a vertical section at right angles to the crank shaft.

Figure II is a similar view to Figure I but showing the piston at its bottom dead center.

Figure III is a vertical section taken at right angles to that shown in Figures I and II.

Figure IV is a section on line 4—4 of Figure II.

Similar reference characters refer to similar parts throughout the several views of the drawings.

The engine has the usual enclosed crank case 1 formed by a base section 2 and an upper section 3 which is shown integral with the cylinder casting, bolted together with bolts 4. The crank shaft 5 has bearings 6 formed where the two sections come together as shown in Figure III. The cylinder 7 has a piston 8 connected to the crank 9 of the crank shaft 5 by the connecting rod 10, all in a well known manner. Between the cylinder 7 and piston 8 there is a cylindrical sleeve 11 which is reciprocated by the crank shaft 5 through the eccentric 12 and eccentric rod 13 which is connected to the sleeve by a pin 14 thereon, as shown in Figure III. The upper part of the cylinder has an enlarged diameter as shown at 15 which forms an annular chamber between the sleeve 11 and cylinder wall, 15. Operating within this chamber is the annular plunger 16 which is integral with the sleeve 11. The cylinder head casting 20 is bolted to the cylinder by bolts 18 and is provided with the annular space 17 to receive the upper portion of the reciprocating sleeve 11. The space 17 is provided with breather holes 19 to the atmosphere.

When the plunger 16 is in its lowest position it uncovers the fuel inlet ports 22. These ports are preferably formed as long narrow slots, as shown in Figure IV, so that the fuel is sprayed in thin sheets which aids in the vaporization of any possible unvaporized particles of fuel. However, these ports may be formed in any other manner which may be best suited for the kind of fuel used, and depending upon whether or not gaseous fuel or a fuel which may contain liquid particles is supplied to ports 22.

The fuel used may be a mixture formed in a carbureter or by any other means, but which is so rich that it will not ignite or burn when highly compressed. Or the fuel used may be a permanently gaseous fuel or fuel oil vaporized by heat and kept in a vaporized condition while in chambers 21 and 26. Hereinafter the term "fuel gas" is used to mean any of the above forms of fuel which may be used.

I have shown a fuel intake manifold 23 embracing the cylinder through which the fuel gas may be supplied under whatever pressure may be best suited. Ordinarily fuel gas at atmospheric pressure is supplied. When the fuel inlet ports 22 are cut off by the ascending plunger 16 the fuel gas is compressed in the chamber 21, preferably to a pressure of about 110 pounds per square inch above atmospheric. Near the top of the stroke the port 24 registers with the by-pass 25 in the stationary wall of the cylinder head 20 whereupon the compressed fuel gas passes into the chamber 26 which is formed within the hollow plunger 16. The chamber 26 filled with compressed gas is now transported downward by the movement of the sleeve 11. When the piston 8 is at or near its top dead center and has compressed air in the clearance space 28 to about 500 pounds per square inch, as will be later herein described, the chamber 26 is uncovered from behind the stationary depending flange 27 on the cylinder head. When this occurs the highly compressed air immediately begins mixing with the compressed fuel gas, raising the pressure in chamber 26 and igniting the mixture as it is formed all around the periphery of the flange 27. As the piston 8 begins its descent the sleeve 11 is travelling at its most rapid rate due to eccentric 12 being approximately 90 degrees ahead of the crank pin 9 and therefore chamber 26 continues to be opened up with the space 28 at a rapid rate. The rate of combustion depends upon the rate at which the fuel gas and air are allowed to mix with each other in combustible proportions, hence the combustion here is not an explosion but a relatively slow burning of the fuel gas as it is permitted to mix with the air. By this means a very high mean effective pressure may be maintained throughout the length of the power stroke and at the same time excessively high maximum pressure in the cylinder is avoided. The wall of the sleeve 11 may be thickened, as shown in the drawings, where it has to withstand the higher pressures without having the cylinder wall contiguous thereto to support it. The space under the plunger 16 is provided with breather ducts 30 to the atmosphere. The air being drawn in and expelled through these ducts aids in the proper cooling of the cylinder.

During the upstroke of the piston 8 a partial vacuum is created in the crank case until the air inlet port 31 is uncovered by the skirt of the piston 8. At the same time a port 32 in the sleeve 11 registers with 31 and air rushes in to fill the crank chamber 1 at nearly atmospheric pressure. When the piston descends on its working stroke the air is compressed until the by-pass 33 from the crank chamber to the cylinder is uncovered by the top of the piston. At the same time a port 34 in the sleeve 11 registers with the by-pass 33 and allows the air to pass into the combustion space above the piston. The exhaust port 35 in the cylinder and the port 36 in sleeve 11 are uncovered by the piston and part of the discharge of burnt gases takes place slightly before by-pass 33 is registered. The fresh air rushing in through 33, 34 forces out the remainder of the burnt gases and thoroughly scavenges the cylinder. Now when the piston 8 ascends the inlet and exhaust ports are closed and the air is compressed to approximately 500 pounds per square inch. This high compression is possible only when the air and fuel are separately compressed to avoid preignition.

I do not wish to be limited to the air and fuel pressures given herein, as my invention contemplates any fuel and air pressures which will cause the engine to operate on the principles above disclosed. The fuel may be compressed to a higher pressure than the air. In this case the fuel streams enter into the combustion chamber when communication is made with chamber 26 and ignition automatically occurs and nonexplosive combustion takes place as in the case above described.

While I have described in more or less detail one embodiment of my invention I do not intend or desire to be limited thereto, as it is obvious to those skilled in the art that the same is capable of various modifications without departing from the scope of the invention as defined by the appended claims.

What I claim is:

1. In an internal combustion engine, in combination, a cylinder, a piston therein, a sleeve operating between the cylinder and piston, means on said sleeve for compressing fuel gas separately from the air compressed by said piston, means for bringing the compressed gas into contact with the compressed air at the beginning of the power stroke, whereby a non-explosive combustion is obtained.

2. In an internal combusion engine, in combination, a cylinder, a piston therein, a sleeve operating between the cylinder and piston, means on said sleeve for compressing fuel gas separately from the air compressed by said piston, means for making a connection between the compressed gas and the combustion space above the piston at the beginning of the power stroke.

3. In an internal combustion engine, a cylinder having a piston therein, a gas chamber and means for compressing fuel gas therein, means for compressing air within the combustion space of said cylinder to several times the compression of said fuel gas, means for intermingling the compressed gas and the compressed air at the beginning of the power stroke so that a non-explosive combustion takes place.

4. In an internal combustion engine, a cylinder having an enlarged bore in one portion thereof, a cylindrical sleeve operable within said cylinder and having a plunger thereon operable within said enlarged bore of said cylinder, a piston operable within said cylindrical sleeve, means for compressing fuel gas with said plunger, means for compressing air in the combustion space of said cylinder, means for causing a slow intermixture of the compressed gas and compressed air to cause a slow burning thereof rather than an explosion.

5. In an internal combustion engine, a cylinder having an enlarged bore in one portion thereof, a cylindrical sleeve operable within said cylinder and having a plunger thereon operable within said enlarged bore of said cylinder for compressing fuel gas therein, a piston operable within said cylindrical sleeve, means for compressing air in the combustion space of said cylinder, means for transporting the compressed gas in a movable chamber, means for interconnecting said movable chamber with said combustion space to cause a slow intermixture and slow burning of the gas and air.

6. In an internal combustion engine, a cylinder having a piston therein for compressing air within the combustion chamber, means for compressing fuel gas within a separate chamber, means for transporting the compressed gas in a movable chamber, means for interconnecting said movable chamber with said combustion chamber to cause a slow intermixture of the gas and air and a slow burning thereof rather than an explosion.

7. In an internal combustion engine, in combination, a cylinder, a piston therein, means for compressing a fuel separately from the air to be mixed therewith, means for compressing said air to a higher pressure than the compressed fuel, means for maintaining said air and fuel separated during compression, means for bringing the compressed fuel and the compressed air into contact at the beginning of the power stroke, whereby non-explosive combustion is automatically maintained during said power stroke.

8. The method of igniting a gaseous fuel mixture in an internal combustion engine, comprising: compressing a gaseous fuel mixture; compressing air adiabatically to a pressure where its temperature equals or exceeds the ignition point of the mixture; transferring the compressed fuel mixture to another zone; and then making communication between the compressed fuel mixture with the compressed air whereby ignition and non-explosive combustion take place.

9. The method of igniting a gaseous fuel mixture in an internal combustion engine, comprising: compressing a gaseous fuel mixture; compressing air adiabatically to a pressure where its temperature equals or exceeds the ignition point of the mixture; transferring the compressed fuel mixture to another zone; and making communication between the compressed fuel mixture with the compressed air at the beginning of the power stroke of said engine, whereby ignition and non-explosive combustion take place.

10. In an internal combustion engine, in combination, a cylinder; a piston therein; means for admitting air into the cylinder and initially compressing the same; means for transferring the initially compressed air to another portion of said cylinder whereby the air may be further compressed to a higher pressure; means for compressing a fuel separately from the air; and means for intermingling the compressed fuel and compressed air at the beginning of the power stroke whereby non-explosive combustion takes place.

11. In an internal combustion engine, in combination, a cylinder; a piston therein; means for admitting air into the cylinder and initially compressing the same; means for transferring the initially compressed air into another portion of said cylinder whereby the air may be further compressed to a higher pressure; a fuel chamber surrounding said cylinder; means for compressing a fuel in said chamber; and means for intermingling the compressed fuel and compressed air at the beginning of the power stroke whereby non-explosive combustion takes place.

12. In an internal combustion engine, in combination, a cylinder; a piston therein; means for admitting air into the cylinder beneath said piston and initially compressing the same; means for transferring the initially compressed air into the cylinder above said piston whereby the air may be further compressed to a higher pressure; a fuel chamber surrounding said cylinder; means in said chamber for compressing the fuel; and means for intermingling the compressed fuel and compressed air at the beginning of the power stroke whereby non-explosive combustion is automatically maintained during said power stroke.

13. In an internal combustion engine, a cylinder having a movable wall; a piston therein; means for compressing air in said cylinder; a fuel chamber surrounding said cylinder; means cooperating with said movable wall for compressing fuel in said fuel chamber; and means for intermingling the compressed fuel and compressed air at the beginning of the power stroke whereby non-explosive combustion takes place.

14. In an internal combustion engine; a cylinder having a movable wall; a piston therein; means for initially compressing air in said cylinder; means for transferring the initially compressed air to another portion of said cylinder whereby the air may be further compressed to a higher pressure by said piston; a fuel chamber surrounding said cylinder; means cooperating with said movable wall for compressing fuel in said fuel chamber; and means for intermingling the compressed fuel and compressed air at the beginning of the power stroke whereby non-explosive combustion takes place.

In testimony whereof, I affix my signature.

CARL P. BROCKWAY.